United States Patent
Plettrichs et al.

(10) Patent No.: US 7,240,944 B2
(45) Date of Patent: Jul. 10, 2007

(54) CARGO SPACE COVER

(75) Inventors: Ulf Plettrichs, Dillishausen (DE); Juergen Klingenberg, Neuried (DE); Fritz Wegener, Gilching (DE); Peter Biecker, Oberhaching (DE)

(73) Assignee: HS Genion GmbH, Krailling (DE)

( * ) Notice: Subject to any disclaimer, the term of this patent is extended or adjusted under 35 U.S.C. 154(b) by 0 days.

(21) Appl. No.: 11/180,591

(22) Filed: Jul. 14, 2005

(65) Prior Publication Data

US 2006/0012206 A1 Jan. 19, 2006

(30) Foreign Application Priority Data

Jul. 16, 2004 (DE) ...................... 10 2004 034 407

(51) Int. Cl.
*B60R 11/00* (2006.01)
(52) U.S. Cl. ..................................... 296/37.16; 296/98
(58) Field of Classification Search ............. 296/37.16, 296/37.8, 98
See application file for complete search history.

(56) References Cited

U.S. PATENT DOCUMENTS

| 5,011,208 | A | * | 4/1991 | Lewallen | .................. 296/37.16 |
| 6,099,222 | A | * | 8/2000 | Moore | ......................... 410/100 |

* cited by examiner

*Primary Examiner*—Joseph D. Pape
(74) *Attorney, Agent, or Firm*—David S. Safran

(57) ABSTRACT

A cargo space cover (26) for the cargo space (18) of a motor vehicle (10), which space can be closed using a rear hatch or tailgate (12). The cargo space cover (12) has a blind-like covering element (28) which can be rolled up at least partially onto a take-up shaft (32). In order to improve the accessibility of the cargo space, the covering element (28), in the operating position, is linked at its front end to a vehicle mount and at its back end to the rear hatch (12) so that the covering element (28) is swung and unrolled from the take-up shaft (32) when the rear hatch (12) is being opened. In a preferred form, the take-up shaft is incorporated into the rear hatch or tailgate.

3 Claims, 1 Drawing Sheet

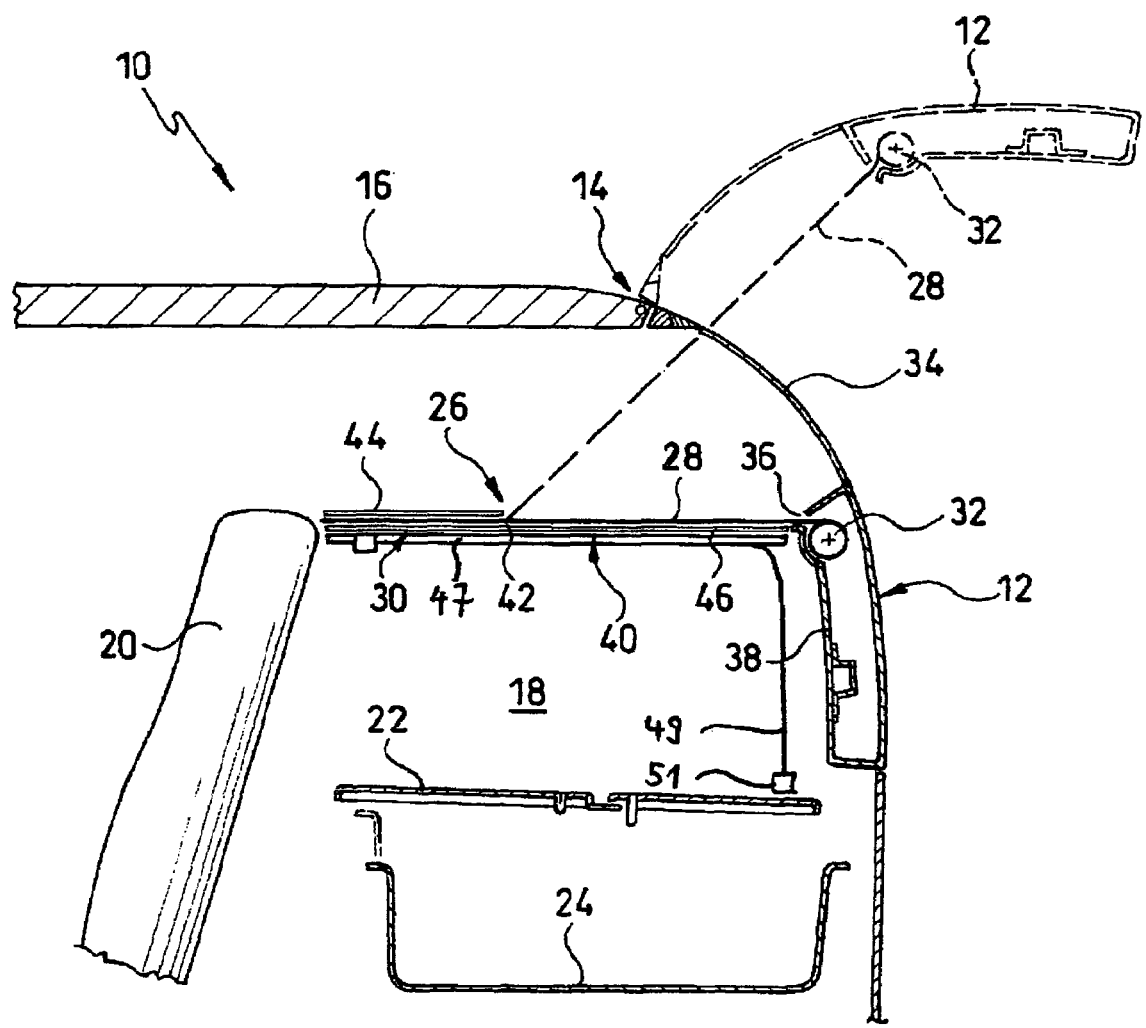

CARGO SPACE COVER

BACKGROUND OF THE INVENTION

1. Field of Invention

The invention relates to a cargo space cover for the cargo space of a motor vehicle, which space can be closed using a rear hatch or tailgate, with a blind-like covering element which can be rolled up at least partially onto a take-up shaft.

2. Description of Related Art

Such a cargo space cover is known from practice and is conventionally made such that a blind-like covering element which is made from a flat, flexible material and which is connected to a take-up shaft which is located behind the backrest of the back seat can be pulled to the rear over the cargo space and can thus be brought into the closed position. To secure the covering element in the closed, extended state it can be suspended on lateral fixing means which are located on the side walls of the cargo space. The covering element is pretensioned in the open direction by a spring means which acts in the peripheral direction of the take-up shaft and which engages it so that the covering element, when opening, is automatically rolled onto the take-up shaft and is held in a housing which surrounds the take-up shaft. The housing can be detachably clamped in the forward area of the cargo space. When large articles are to be placed in the cargo space or removed from it, in particular the back end area of the covering element, can have a disruptive effect. Conventionally, the covering element is opened in such a case, i.e., rolled up, or even removed from the vehicle together with the housing and the take-up shaft.

Furthermore, cargo space covers are known which have a covering element made of a rigid plate which can be swung up via a shear linkage when the rear plate is being opened. However, these cargo space covers are very bulky.

SUMMARY OF THE INVENTION

A primary object of the invention is to devise a cargo space cover of the initially named type which offers improved accessibility of the cargo space even in the extended state when the vehicle is being loaded and unloaded over the back of the vehicle.

This object is achieved by the covering element, in the operating position, being linked at its front end to a vehicle mount and at its back end to the rear hatch so that the covering element is swung and unrolled from the take-up shaft when the rear hatch is being opened.

By the design of the cargo space cover in accordance with the invention, the covering element in the pulled-tight or closed when the rear hatch is being opened and is swung up together with it so that a large opening cross section of the cargo space is present and the covering element does not constitute a barrier in the loading and unloading process. With the opening of the rear hatch, the area of the covering element which has been unrolled from the take-up shaft is increased by the amount by which the distance is increased between the linkage area for the covering element to the rear hatch and the vehicle-mounted linkage area for the covering element. When the rear hatch is closed, the covering element is swung back again into its initial position so that it forms an essentially horizontally aligned flat cover for the cargo space. Here, the area of the covering element which has been unwound from the take-up shaft when the rear hatch is being opened is wound up again onto the take-up shaft. In the closed state of the rear hatch and of the covering element, therefore a material reserve for the covering element is rolled up on the take-up shaft.

The roll-up process can take place automatically when the take-up shaft is spring-loaded in the peripheral direction, and thus, a tensile force is applied to the covering element.

The cargo space cover of the invention is especially suited for use in so-called station wagons, in vans, in compact vans or in so-called sport utility vehicles (SUB), all of which have a rear hatch or tailgate and in which the cargo space, among others, is covered with a covering element for safety reasons.

In one preferred embodiment of the cargo space cover in accordance with the invention, the take-up shaft is integrated in the rear hatch. In this way, the covering element is held essentially entirely in the rear hatch in the completely rolled-up state, i.e., when the front vehicle-mounted linkage of the covering element is released. The cargo space is then not traversed by a possibly disruptive housing for the take-up shaft and the covering element. The cargo space, in this case, can therefore be fully used to underneath the vehicle roof of the pertinent motor vehicle without further measures.

Alternatively, of course, it is possible for the take-up shaft, as usual, to be fixed securely on the vehicle, for example, by means of a housing which can be clamped in the vehicle and connected to the front end of the covering element, and for the back end of the covering element to be detachably connected to the rear hatch, for example, via a so-called draw hoop. The draw hoop can be suspended on the rear hatch. When preferably detachable fixing of the covering element to the rear hatch takes place manually, it is then advantageous if the rear hatch is provided with a separately hinged area, such as a window.

In order to be able to easily move the covering element into the operation position, i.e., to close it, on the one hand, and on the other hand, to be able to move it into the open position, there are vehicle-mounted guide rails which are located preferably on either side of the covering element, of which at least one is provided with a linear drive for the covering element. The linear drive for opening and closing the covering element engages its lateral areas which are guided in the guide rails or its free end and guides it either to the back or to the front.

The linear drive can also be used for vehicle-mounted fixing of the front end of the covering element, in this case the take-up shaft being integrated in the rear cover. However, if the take-up shaft is 1vehicle-mounted, i.e., in the vehicle interior, it is advantageous if the back end of the covering element interacts with a holding mechanism for fixing on the rear hatch.

In order to be able to swing the covering element up along a defined folding edge when the rear hatch is being opened, the guide rails each preferably have a front, slot-like guide area and a back support area which is open to the top.

One embodiment of a cargo space cover in accordance with the invention is shown schematically simplified in the drawings and is explained in detail in the following specification.

BRIEF DESCRIPTION OF THE DRAWINGS

The sole FIGURE of the drawings shows a lengthwise section through the rear area of a motor vehicle which is provided with a rear hatch.

DETAILED DESCRIPTION OF THE INVENTION

The drawings show a motor vehicle 10 which is made as a so-called station wagon, van or the like and which is provided with a rear hatch or tailgate 12 which is coupled via hinge elements 14 to the roof 16 of the vehicle 10, and which can be swung up to open the rear-side opening of the vehicle 10. The rear hatch 12 forms the rear boundary of the cargo space 18 which for the arrangement shown in the drawings is bordered on the side facing away from the rear hatch, i.e., forward, by the hinged backrest 20 of the rear bench of the vehicle 10. Furthermore, the cargo space 18 is provided with a cargo floor which covers a trough 24.

The cargo space 18 is provided with a cargo space cover 26 which comprises a covering element 28 which in the operating position, i.e., in the closed and extended state, forms a flat surface which extends between the top edge of the backrest 20 of the back seat and the rear hatch 12 and is guided in guide rails 30 which are located on both sides on the lateral cargo space walls.

The covering element 28 is made in the manner of a blind and interacts with a take-up shaft 32 which is integrated in the rear hatch 12 underneath the back window 34. The covering element 28 comprises a flexible plastic material and can thus be rolled onto the take-up shaft 32.

In the operating position, i.e., in the arrangement which is shown in the FIGURE, the covering element 28, in its front end area which borders the backrest 20 of the rear seat, is linked on a vehicle mount. With its back end, i.e., with its end facing away from the backrest 20, the covering element 28 is linked to the rear hatch 12 via the take-up shaft 32.

Furthermore, at the height of the take-up shaft 32, on the inside lining 38 of the rear hatch 12, a slot 36 is formed via which the covering element 29 emerges from the rear hatch 12 and is guided to a guide area 40 which is flush with the guide rails 30. The guide area 40 forms a transfer area by means of which the covering element 28, for travel into the operating position, i.e., for unwinding from the take-up shaft, can be transferred to a linear drive 47 which is integrated into the guide rails 30. The linear drive, which is feasibly provided with an electric motor 51, is used to unwind the covering element 28 from the take-up shaft 32 and to guide it forward over the cargo space 18 via, e.g., a drive cable 49, so that the cargo space 18 is closed to the top.

When the rear hatch 12 is being opened, i.e., when the rear hatch 12 is swung into the position which is shown by the broken lines in the FIGURE, the covering element 28 is swung up together with the rear hatch 12. In the swinging process, the covering element 28 is unrolled further from the take-up shaft 32 by an additional amount which is matched to the respective opening of the rear hatch, its always being linked to the front by a vehicle mount, and to the rear, to the rear hatch 12. During swinging, the covering element is folded along the folding edge 42 which is formed by the rear edges of the top leg of the slotted guide area 44 of the guide rails 30. The slotted guide area 44 passes on the rear side into a support area 46 of the guide rails 30, which area is open to the top.

Due to the relatively long extension path or material reserve for the covering element 28 in the mechanism which is formed by the take-up shaft 32, it is possible to open the rear hatch 12 even when the cargo space cover 26 is closed. The swinging of the covering element 28 up improves the accessibility of the cargo space 18.

What is claimed is:

1. A motor vehicle with a cargo space that is openable and closable via a rear hatch or tailgate, a blind-like covering element for the cargo space and a take-up shaft for at least partially rolling up the covering element, wherein the covering element, in an operating position is linked at its front end to a vehicle mount and at its back end to the rear hatch or tailgate, the covering element being adapted to swing and unroll from the take-up shaft when the rear hatch is being opened, further comprising vehicle-mounted guide rails which are located on either side of the covering element, and wherein each of the guide rails has a forward, slot-like guide area and a rear support area which is upwardly open.

2. Cargo space cover as claimed in claim 1, wherein the take-up shaft is integrated in the rear hatch.

3. Cargo space cover as claimed in claim 1, wherein at least one of the guide rails is provided with a linear drive for the covering element.

* * * * *